(12) United States Patent
Jung

(10) Patent No.: US 7,852,426 B2
(45) Date of Patent: Dec. 14, 2010

(54) LIQUID CRYSTAL DISPLAY

(75) Inventor: Youn-hwan Jung, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 175 days.

(21) Appl. No.: 11/907,783

(22) Filed: Oct. 17, 2007

(65) Prior Publication Data

US 2008/0165304 A1 Jul. 10, 2008

(30) Foreign Application Priority Data

Jan. 9, 2007 (KR) .................. 10-2007-0002530

(51) Int. Cl.
*G02F 1/1333* (2006.01)
(52) U.S. Cl. ..................................... 349/58
(58) Field of Classification Search ............. None
See application file for complete search history.

(56) References Cited

U.S. PATENT DOCUMENTS

| 6,177,971 | B1 * | 1/2001 | Jung et al. .................... 349/60 |
| 6,977,694 | B2 | 12/2005 | Natsuyama |
| 7,113,237 | B2 | 9/2006 | Nitto et al. |
| 7,254,013 | B2 | 8/2007 | Tatsukamai et al. |
| 2002/0081115 | A1 * | 6/2002 | Suzuki et al. ............... 396/429 |
| 2002/0105605 | A1 * | 8/2002 | Huang et al. ................. 349/58 |
| 2004/0174470 | A1 | 9/2004 | Mori |
| 2006/0028594 | A1 * | 2/2006 | Chou ........................... 349/58 |
| 2006/0087804 | A1 | 4/2006 | Tsukamoto |
| 2006/0203141 | A1 * | 9/2006 | Lee .............................. 349/58 |
| 2006/0232099 | A1 * | 10/2006 | Polewarczyk ............ 296/146.1 |
| 2006/0232999 | A1 * | 10/2006 | Chang et al. ................ 362/633 |
| 2008/0067933 | A1 * | 3/2008 | Wang et al. .................. 313/512 |

FOREIGN PATENT DOCUMENTS

| JP | 10-187060 A | * | 7/1998 |
| JP | 2000-098369 | | 4/2000 |
| JP | 2002-31791 A | * | 1/2002 |
| JP | 2004-271893 | | 9/2004 |
| KR | 10-2002-0016512 A | | 3/2002 |
| KR | 10-2004-0086188 A | | 10/2004 |
| KR | 10-2005-0073508 A | | 7/2005 |
| KR | 10-2006-0015753 A | | 2/2006 |
| KR | 10-2006-0060218 | | 6/2006 |

* cited by examiner

*Primary Examiner*—Mike Stahl
(74) *Attorney, Agent, or Firm*—Lee & Morse, P.C.

(57) ABSTRACT

Example embodiments relate to a liquid crystal display and a method thereof. The liquid crystal display may include a display panel having a liquid crystal layer interposed between a first substrate and a second substrate, and a bezel having a lower surface, sidewalls formed perpendicularly to the lower surface, and extension members formed horizontally with the lower surface on upper end portions of the sidewalls. The display panel may be received in the bezel so that the first substrate may correspond to the lower surface, and side surfaces of the first substrate may correspond to the sidewalls.

20 Claims, 3 Drawing Sheets

LIQUID CRYSTAL DISPLAY

CROSS-REFERENCE TO RELATED APPLICATION

This application is related to co-pending U.S. patent application Ser. No. 11/907,782, entitled "LIQUID CRYSTAL DISPLAY," which was filed on Oct. 17, 2007.

BACKGROUND OF THE INVENTION

1. Field of the Invention

Example embodiments relate to a liquid crystal display and a manufacturing method thereof, and more particularly, to a liquid crystal display having a display panel received in a bezel and a manufacturing method thereof.

2. Description of the Related Art

Generally, a liquid crystal display (LCD) may include a display panel in which a liquid crystal may be injected between two substrates disposed opposite to each other, a back light unit positioned in a lower portion of the display panel and used as a light source, and a LCD drive integrated circuit (IC) for driving the liquid crystal of the display panel.

Further, a pixel region may be defined by a plurality of gate lines and data lines arranged on the substrates in a matrix type. A thin film transistor controlling signals supplied to each pixel and a pixel electrode connected to the thin film transistor may be formed on one substrate with a portion intersecting the gate lines with the data lines, and a color filter and a common electrode may be formed on the other substrate. Further, each polarizing plate may be formed on a rear surface of the substrates and the back light unit may be disposed in a lower portion of the polarizing plates as a light source.

The LCD drive IC for driving the liquid crystal may be mounted around the pixel region of the display panel. The LCD drive IC may include a printed circuit board (PCB) mounted with components for generating scan signals and data signals, for example, and a driving circuit for providing signals to a display panel. Further the LCD drive IC may convert the external electrical signals into scan signals and data signals, which may then be output to the gate lines and the data lines.

However, display panels formed with substrates may typically be made of glass, for example, which may cause problems, e.g., breakage against impact from external forces. In other words, as portable devices, e.g., a cellular phone, become smaller, a thickness of the display panel may be thinner, which may cause the display panel to be susceptible to impact (even to a small impact). Thus, there has been a demand for the development of a bezel capable of protecting the display panel.

SUMMARY OF THE INVENTION

Example embodiments are therefore directed to a liquid crystal display, and a manufacturing method thereof, which substantially overcome one or more of the problems due to the limitations and disadvantages of the related art.

It is therefore a feature of example embodiments to provide a liquid crystal display with a bezel capable of safely protecting a display panel from impact.

It is therefore another feature of example embodiments to provide a liquid crystal display with a bezel having sidewalls to improve strength and rigidity.

It is therefore another feature of example embodiments to provide a liquid crystal display with a bezel that may be easily mounted on an outer case.

At least one of the above and other features of example embodiments may provide a liquid crystal display including a display panel having a liquid crystal layer interposed between a first substrate and a second substrate, and a bezel having a lower surface, sidewalls formed perpendicularly to the lower surface, and extension members formed horizontally with the lower surface on upper end portions of the sidewalls. The display panel may be received in the bezel so that the first substrate may correspond to the lower surface, and side surfaces of the first substrate may correspond to the sidewalls.

At least one of the above and other features of example embodiments may provide a method of forming a liquid crystal display, the liquid crystal display may include a display panel having a liquid crystal layer interposed between a first substrate and a second substrate and a bezel having a lower surface, sidewalls and extension members. The method may include forming the sidewalls perpendicular to the lower surface, and forming the extension members horizontal with the lower surface on upper end portions of the sidewalls. The display panel may be received in the bezel so that the first substrate may correspond to the lower surface, and side surfaces of the first substrate may correspond to the sidewalls

BRIEF DESCRIPTION OF THE DRAWINGS

The above and other features and advantages of the example embodiments will become more apparent to those of ordinary skill in the art by describing in detail exemplary embodiments thereof with reference to the attached drawings, in which.

DETAILED DESCRIPTION OF THE INVENTION

Korean Patent Application No. 10-2007-0002530, filed on Jan. 9, 2007, in the Korean Intellectual Property Office, entitled: "Liquid Crystal Display," is incorporated by reference herein in its entirety.

Example embodiments will now be described more fully hereinafter with reference to the accompanying drawings. Example embodiments may, however, be embodied in different forms and should not be construed as limited to the embodiments set forth herein. Rather, these example embodiments are provided so that this disclosure will be thorough and complete, and will fully convey the scope of the invention to those skilled in the art.

Figure 1:
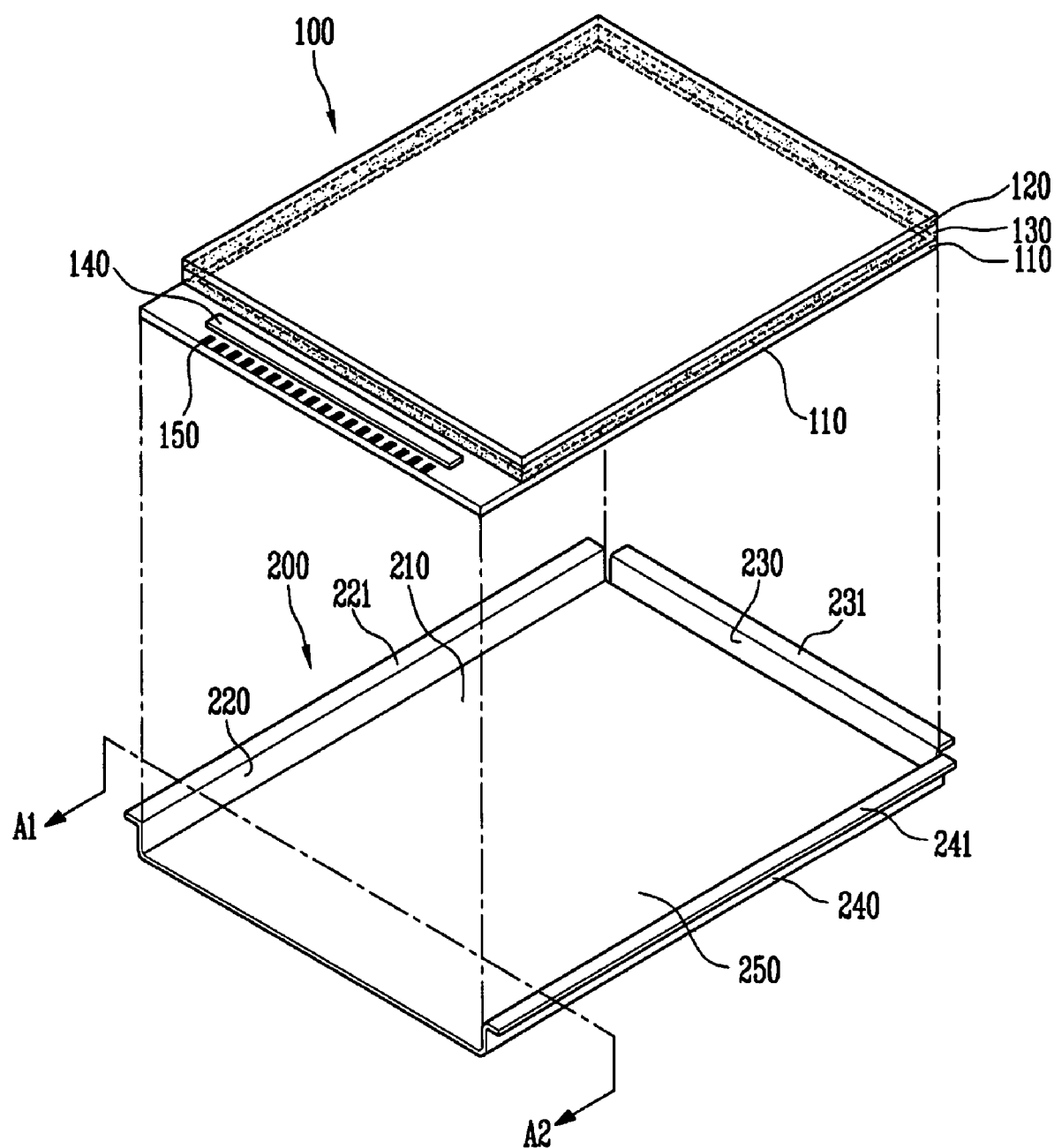
FIG. 1 illustrates an exploded perspective view of a liquid crystal display according to an example embodiment.

FIG. 1 illustrates an exploded perspective view of a liquid crystal display (LCD) according to an exemplary embodiment. The LCD may include a display panel 100 and a bezel 200 for receiving the display panel 100.

Figure 2:
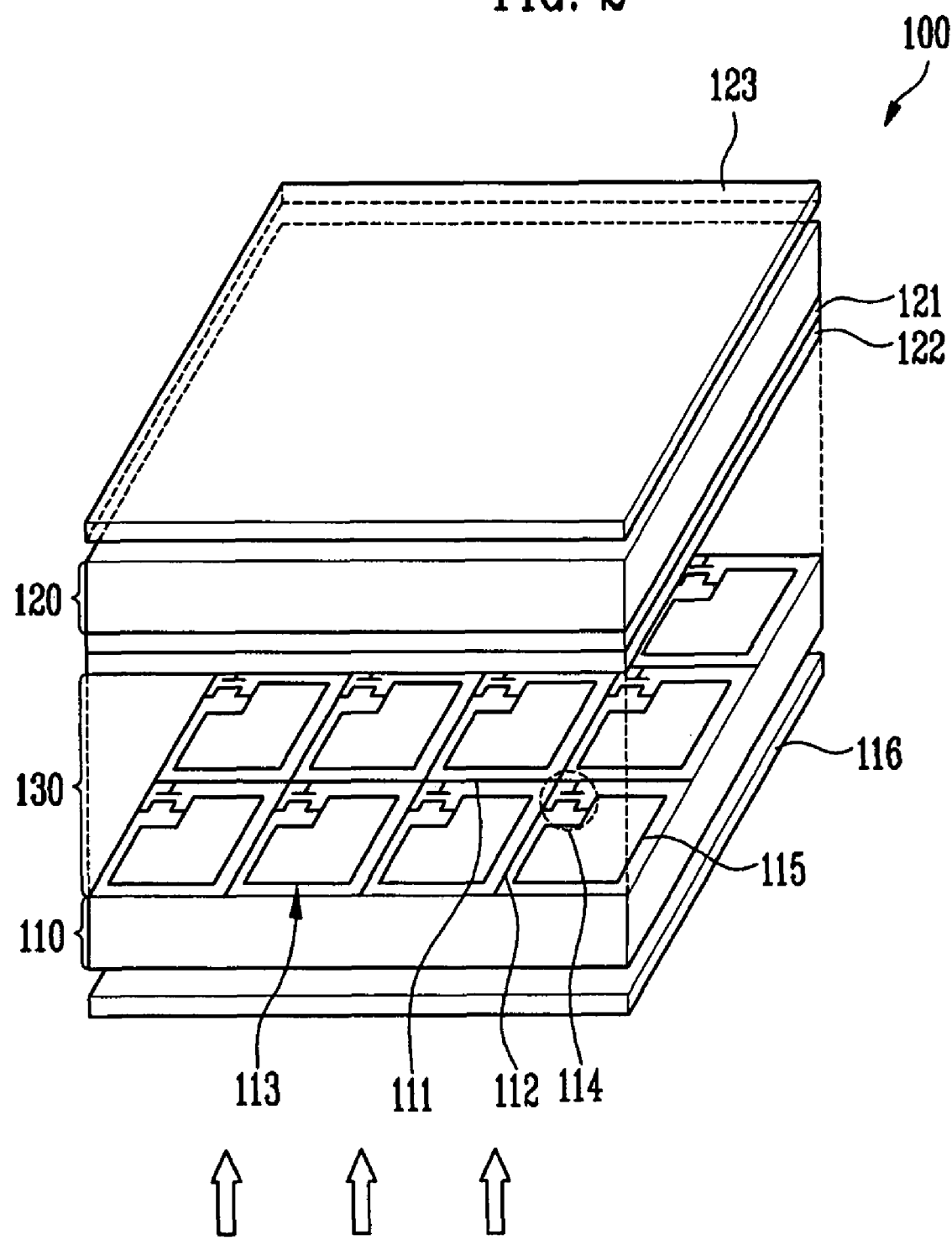
FIG. 2 illustrates an exploded perspective view of a display panel as shown in FIG. 1.

FIG. 2 illustrates an exploded perspective view of the display panel as shown in FIG. 1.

Referring to FIGS. 1 and 2, the display panel 100 may include a lower substrate 110 and an upper substrate 120 disposed opposite to each other, and a liquid crystal layer 130 interposed between the lower substrate 110 and the upper substrate 120. It should be appreciated that other layers and/or elements may be disposed between the lower substrate 110 and the upper substrate 120.

A plurality of gate lines 111 and data lines 112 may be arranged on the lower substrate 110 in a matrix. One skilled in the art should appreciate that the gate lines 111 and the data lines 112 may be arranged in other arrangements. Pixel electrodes 115 may be formed on pixel regions 113 defined by the gate lines 111 and the data lines 112 intersecting each other. A thin film transistor 114 may supply signals to the pixel electrodes 115. The thin film transistor 114 may be formed on the lower substrate 110 with portions intersecting the gate lines 111 with the data lines 112.

A color filter 121 and a common electrode 122 may be formed on the upper substrate 120. Further, polarizing plates 116 and 123 may be installed on rear sides of the lower substrate 110 and the upper substrate 120, respectively, and a back light unit (not shown) may be disposed on a lower portion of the polarizing plate 116 as a light source.

A LCD drive integrated circuit (IC) 140 for driving liquid crystal of the display panel 100 may be mounted on the surrounding of the pixel region 113 on the lower substrate 110. The LCD drive IC 140 may include a printed circuit board (PCB) mounted with components generating scan signals, data signals and other signals, and a driving circuit for supplying signals to the display panel 100. The LCD drive IC 140 may also convert the external electrical signals (via a pad part 150) into scan signals and data signals, and may supply the signals to the gate lines 111 and the data lines 112. It should be appreciated that the LCD drive IC 140 may include other components besides the ones mentioned above.

The pad part 150 may be connected with a flexible printed circuit (FPC)(not shown) in a film form, and the external signals may be input through the FPC.

The bezel 200 may be configured to receive the lower substrate 110 of the display panel 100. The bezel 200 may include a lower surface 210, sidewalls 220, 230 and 240 perpendicular to the lower surface 210, and extensions 221, 231 and 241 horizontally formed with the lower surface 210 on upper end portions of the sidewalls 220, 230 and 240.

A receiving space 250 for receiving the display panel 100 may be formed by the lower surface 210 and the sidewalls 220, 230 and 240. The display panel 100 may be received so that the lower surface 210 may correspond to the lower substrate 110, and side surfaces of the lower substrate 110 may correspond to the sidewalls 220, 230 and 240. It should be appreciated that the lower substrate 110 may be attached to the lower surface 210 by an adhesive tape and/or an adhesion. It should further be appreciated that other attachment mechanisms may be employed to attach the lower substrate 110 to the lower surface 210.

Figure 3:
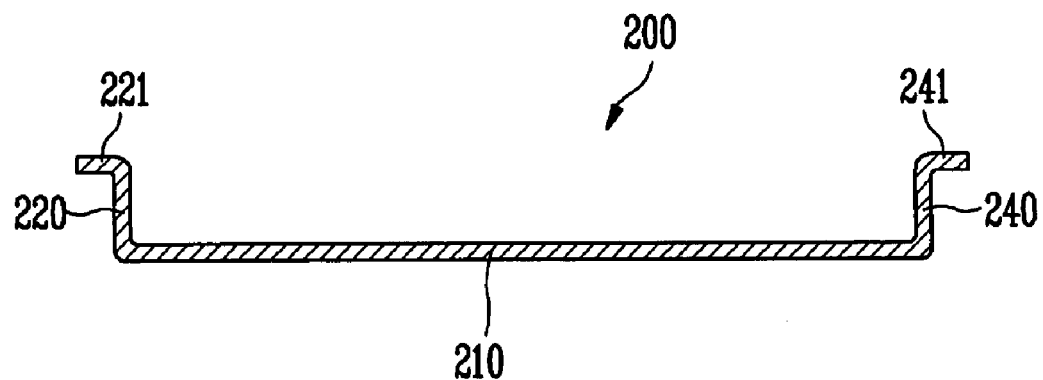
FIG. 3 illustrates a cross-sectional view taken along line A1-A2 in FIG. 1.

FIG. 3 illustrates a cross-sectional view of a bezel 200 according to an example embodiment (taken along line A1-A2 in FIG. 1).

The bezel 200 may be manufactured by bending metal, for example, which may be formed by using a plate shape or a mold. It should be appreciated that other techniques may be employed to form the bezel 200. The side walls 220, 230 and 240 and extensions 221, 231 and 241 may be integrally formed on the lower surface 210; or the sidewalls 220, 230 and 240 and extensions 221, 231 and 241 may be separately assembled after being manufactured as a separate structure. In an example embodiment, the sidewalls 220, 230 and 240 may be formed perpendicularly extending from edges of the lower surface 210, and the extensions 221, 231 and 241 may be formed perpendicularly extending from upper end portions of the sidewalls 220, 230 and 240.

Further, the lower end portions of the sidewalls 220, 230 and 240 may be perpendicularly bonded (e.g., welded) to the edges of the lower surface 210, and the extensions 221, 231 and 241 may be perpendicularly bonded (e.g., welded) to the upper end portions of the sidewalls 220, 230 and 240.

One skilled in the art should appreciate that other techniques besides welding may be employed to form the side walls 220, 230 and 240 and the extensions 221, 231 and 241, e.g., soldering, brazing adhering and/or riveting.

Further, as shown in FIG. 1, the sidewalls 220, 230 and 240 may be formed on three surfaces so that a flexible printed circuit FPC (not shown) may be easily inserted to the pad part 150. However, it should further be appreciated that the sidewalls 220, 230 and 240 may be formed on four surfaces (as shown in FIG. 4).

Figure 4:
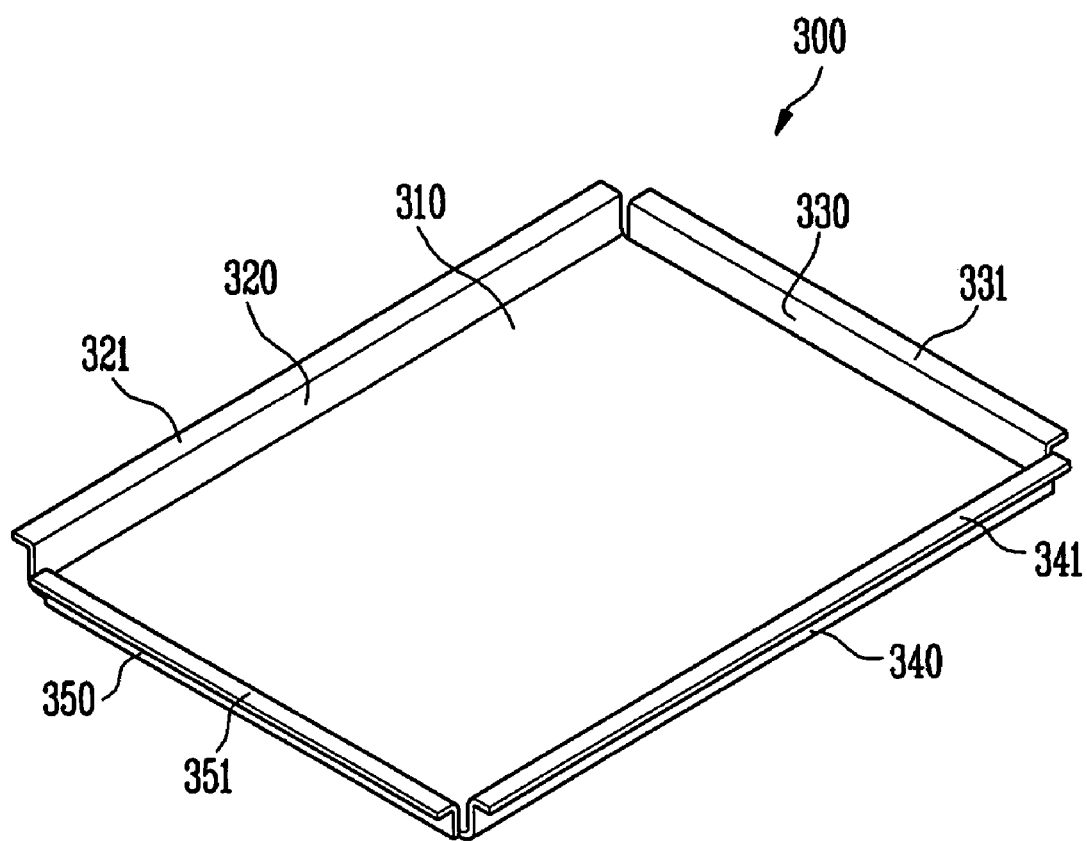
FIG. 4 illustrates a perspective view of a bezel according to an example embodiment.

FIG. 4 illustrates a perspective view of a bezel 300 according to an example embodiment.

The bezel 300 may include a lower surface 310, sidewalls 320, 330, 340 and 350 formed perpendicular to the lower surface 310, and extensions 321, 331, 341 and 351 formed perpendicular to upper end portions of the sidewalls 320, 330, 340 and 350.

Further, because extensions 321, 331, 341 and 351 may be formed perpendicular to the upper end portions of the sidewalls 320, 330, 340 and 350, the extensions 321, 331, 341 and 351 may be securely attached to a front surface of the liquid crystal display, which may be easily mounted on a window portion of an outer case.

Referring to FIG. 4, a height of one sidewall 350 may be formed to be equal to or lower than that of the lower substrate 110 so that the FPC (not shown) may be easily inserted to a pad part 150, while at the same time, all side surfaces of the display panel 100 may remain protected. However, it should be appreciated that in other example embodiments, the height of each of the sidewalls 20, 430, 440 and 450 may have different heights or that all the sidewalls 420, 430, 440 and 450 may be the same height.

Accordingly, the sidewalls of bezels 200 and 300 may have a generally I-type structure by the lower surface and the extensions. That is, the strength (W) of the sidewalls may be represented as shown in the following equation 1.

$$W = \frac{I_x}{Y_{max}} \quad \text{[Equation 1]}$$

Where, $I_x$ may represent inertia moment of X axis, and $Y_{max}$ may represent maximum value of distance from a central axis to an upper end portion of the sidewalls.

Referring to Equation 1, assuming that the maximum value of distance from the central axis to the lower surface may be $Y_{min}$ and $I_x$ may be constant, the maximum strength (W) may be obtained when $Y_{max}=Y_{min}$. Therefore, since the central axis may be located on the upper portion by the extension, as compared to a conventional structure, the condition of $Y_{max}=Y_{min}$ may provide improved strength and rigidity so that the sidewalls may not be easily deformed by stress.

Example embodiments may provide a bezel with an extension, which may be horizontally formed with a lower surface on an upper end portion of a sidewall. The sidewall may have a generally I-type structure by the lower surface and the extension so that the sidewalls may not be easily deformed by stress. Therefore, the impact transferred to the display panel may be reduced, while safely protecting the display panel, and preventing and/or reducing deformation of the sidewalls.

Moreover, a front surface of the LCD may be sufficiently secured by the extension, which may be easily mounted on a window portion of an outer case.

The terminology used herein is for the purpose of describing particular embodiments only and is not intended to be limiting of example embodiments. As used herein, the term "bezel" may mean any structure that may support a display panel and/or may safely protect the display panel from impact.

In the figures, the dimensions of layers and regions may be exaggerated for clarity of illustration. It will also be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Further, it will be understood that when a layer is referred to as being "under" or "above" another layer, it can be directly under or directly above, and one or more intervening layers may also be present. In addition, it will also be understood that when a layer is referred to as being "between" two layers, it can be the only layer between the two layers, or one or more intervening layers may also be present. Like numbers refer to like elements throughout. As used herein, the term "and/or" includes any and all combinations of one or more of the associated listed items.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A liquid crystal display, comprising:
   a display panel having a liquid crystal layer interposed between a first substrate and a second substrate; and
   a bezel having a lower surface, sidewalls formed perpendicularly to the lower surface, and extension members formed horizontally with the lower surface on upper end portions of the sidewalls,
   wherein the extension members of the bezel are on upper terminal ends of the sidewalls and the lower surface of the bezel is on lower terminal ends of the sidewalls, the upper terminal ends of the sidewalls being opposite the lower terminal ends of the sidewalls, and the extension members being adjacent to a front surface of the liquid crystal display,
   wherein the display panel is received in the bezel so that the first substrate corresponds to the lower surface, and side surfaces of the first substrate correspond to the sidewalls, and wherein a height of at least one sidewall of the sidewalls is equal to or lower than a height of the first substrate.

2. The liquid crystal display as claimed in claim 1, wherein the bezel is a metal plate.

3. The liquid crystal display as claimed in claim 1, wherein the sidewalls are integrally formed on the lower surface of the bezel.

4. The liquid crystal display as claimed in claim 1, wherein the sidewalls are separately formed on the lower surface of the bezel.

5. The liquid crystal display as claimed in claim 3, wherein the extension members are integrally formed on the upper end portion of the sidewall.

6. The liquid crystal display as claimed in claim 4, wherein the extension members are separately formed on the upper end portion of the sidewall.

7. The liquid crystal display as claimed in claim 1, wherein the sidewalls correspond to at least three surfaces of the display panel, the sidewalls overlapping entire lengths of the at least three surfaces of the display panel.

8. The liquid crystal display as claimed in claim 7, wherein the sidewalls overlap entire heights of at least three surfaces of the first substrate, the three surfaces of the first substrate corresponding to the at least three surfaces of the display panel.

9. The liquid crystal display as claimed in claim 1, wherein the height of all of the sidewalls is equal to or lower than the height of the first substrate, the height of the sidewall being an entire distance measured from the lower surface of the bezel to a bottom of a respective extension member, and the height of the first substrate being an entire distance measured between two opposite surfaces of the first substrate along a direction parallel to the height of the sidewall.

10. The liquid crystal display as claimed in claim 1, wherein the first substrate is directly attached to the lower surface of the bezel.

11. A method of manufacturing a liquid crystal display, the liquid crystal display includes a display panel having a liquid crystal layer interposed between a first substrate and a second substrate, and a bezel having a lower surface, sidewalls and extension members, the method comprising:
   forming the sidewalls perpendicular to the lower surface;
   forming the extension members horizontal with the lower surface on upper end portions of the sidewalls; and
   placing the display panel in the bezel so that the first substrate corresponds to the lower surface, and side surfaces of the first substrate correspond to the sidewalls,
   wherein the extension members of the bezel are on upper terminal ends of the sidewalls and the lower surface of the bezel is on lower terminal ends of the sidewalls, the upper terminal ends of the sidewalls being opposite the lower terminal ends of the sidewalls, and the extension members being adjacent to a front surface of the liquid crystal display, and wherein a height of at least one sidewall of the sidewalls is equal to or lower than a height of the first substrate.

12. The method as claimed in claim 11, wherein the sidewalls are integrally formed on the lower surface of the bezel.

13. The method as claimed in claim 11, wherein the sidewalls are separately formed on the lower surface of the bezel.

14. The method as claimed in claim 12, wherein the extension members are integrally formed on the upper end portion of the sidewall.

15. The method as claimed in claim 13, wherein the extension members are separately formed on the upper end portion of the sidewall.

16. The method as claimed in claim 11, wherein the sidewalls correspond to three surfaces of the display panel.

17. The method as claimed in claim 11, wherein the sidewalls correspond to four surfaces of the display panel.

18. The method as claimed in claim 11, further comprising directly securing the first substrate to the lower surface.

19. The liquid crystal display as claimed in claim 1, wherein the extension members extend away from an interior of the bezel, such that the extension members and lower surface of the bezel do not overlap each other.

20. The liquid crystal display as claimed in claim 1, wherein a peripheral portion of an upper surface of the first substrate within the bezel is exposed to an exterior of the bezel.

* * * * *